Figure 1:
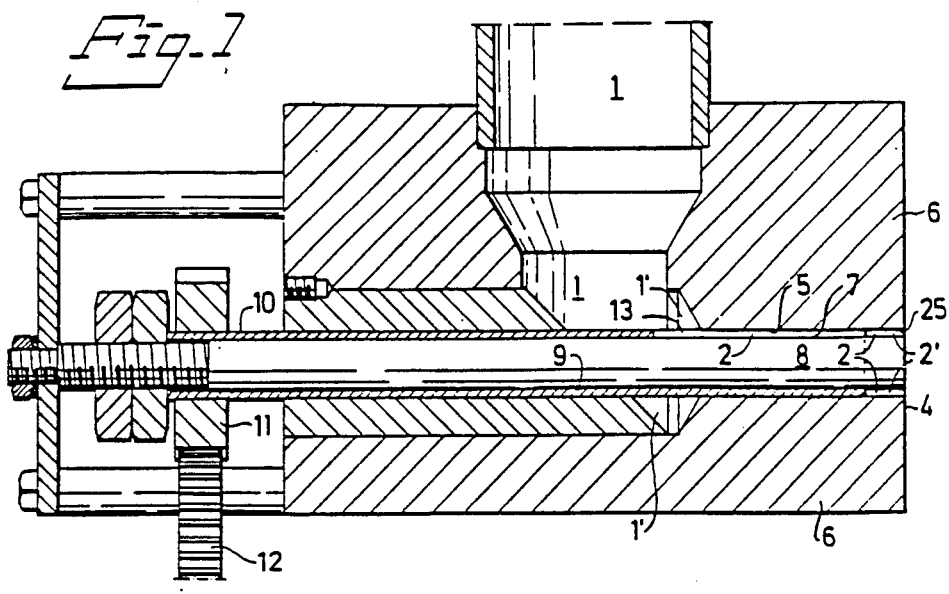

United States Patent [19]

Dziewanowski et al.

[11] Patent Number: 4,686,075
[45] Date of Patent: Aug. 11, 1987

[54] METHOD OF MANUFACTURING EXTRUDED PIPES AND APPARATUS FOR CARRYING OUT THE METHOD

[75] Inventors: André Dziewanowski, Stockholm; Krzysztof Piotrowski, Sollentuna; Krzysztof Zaremba, Vallentuna, all of Sweden

[73] Assignee: Mats Lundberg, Sundsvall, Sweden

[21] Appl. No.: 681,849

[22] PCT Filed: Apr. 9, 1984

[86] PCT No.: PCT/SE84/00128
§ 371 Date: Dec. 11, 1984
§ 102(e) Date: Dec. 11, 1984

[87] PCT Pub. No.: WO84/04070
PCT Pub. Date: Oct. 25, 1984

[30] Foreign Application Priority Data
Apr. 12, 1983 [SE] Sweden .................. 8302033

[51] Int. Cl.[4] .................................... B29C 47/24
[52] U.S. Cl. ...................... 264/209.2; 264/108; 264/310; 264/312; 425/376 B; 425/381; 425/466; 425/467
[58] Field of Search ............ 264/209.2, 173, 108, 264/310, 312; 425/376 B, 381, 465, 466, 467, 380, 376 R, 204, 376 A, 206

[56] References Cited
U.S. PATENT DOCUMENTS

| 2,046,541 | 7/1936 | Becker | 425/381 |
| 2,345,086 | 3/1944 | Becker et al. | 425/380 |
| 2,676,356 | 4/1954 | Becker | 425/381 |
| 3,221,372 | 12/1965 | Lieberman | 425/467 |
| 3,279,501 | 10/1966 | Donald | 264/108 |
| 3,289,251 | 12/1966 | Daubenfeld | 425/380 |
| 3,314,108 | 4/1967 | Wienand | 425/380 |
| 3,317,956 | 5/1967 | Lippens | 425/376 R |
| 3,443,277 | 5/1969 | Frielingsdorf | 264/70 |
| 3,479,989 | 11/1969 | Hunter et al. | 425/113 |
| 3,781,153 | 12/1973 | Lukach et al. | 425/207 |
| 3,933,960 | 1/1976 | Cameron et al. | 264/108 |
| 4,057,610 | 11/1977 | Goettler et al. | 264/108 |
| 4,138,503 | 2/1979 | Ziolko | 264/209.2 |

FOREIGN PATENT DOCUMENTS 493364 7/1976 U.S.S.R. .................. 425/381

Primary Examiner—Jeffery Thurlow
Attorney, Agent, or Firm—Nies, Webner, Kurz & Bergert

[57] ABSTRACT

A method of manufacturing extruded pipes where plasticized material, for example plastic material, is advanced to an extrusion nozzle comprising a circular gap (2). The method is especially characterized in that the material is transported axially in said gap (2) while material is moved, for example rotated, in the circumferential direction of the gap (2) so that the material at least partially is caused to assume an orientation deviating from the axial direction, whereby a non-axial orientation will prevail in the extruded pipe (3) and increase the strength. The invention also relates to an apparatus for carrying out the method.

13 Claims, 9 Drawing Figures

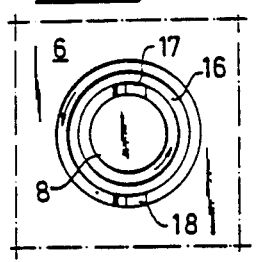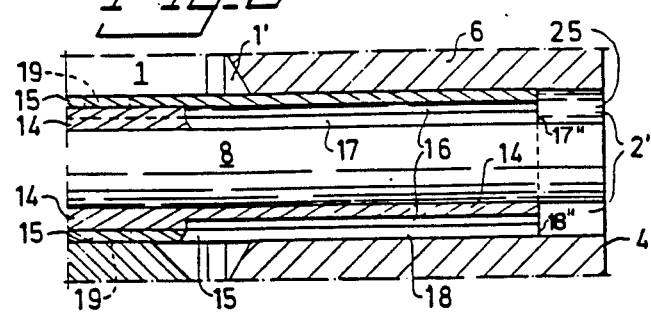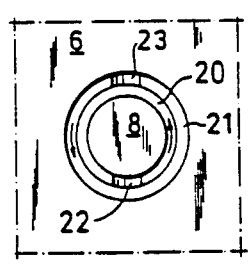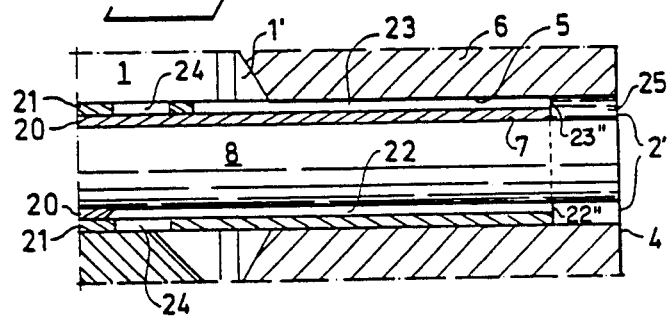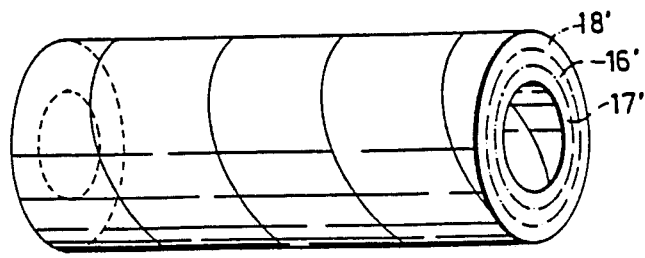

METHOD OF MANUFACTURING EXTRUDED PIPES AND APPARATUS FOR CARRYING OUT THE METHOD

This invention relates to a method of manufacturing extruded pipes where plasticized material, for example plastic material, is advanced to an extrusion nozzle comprising a circular gap. The invention also relates to an apparatus for carrying out the method.

Using known methods the material is transported through an extrusion nozzle substantially only in parallel with the longitudinal direction of the extruded pipe, whereby the molecules of the material are oriented in said longitudinal direction. The orientation thus obtained brings about a certain reinforcement effect in said longitudinal direction, but not, for example, in the circumferential direction of the pipe.

The present invention relates to a method and an apparatus, in which orientation occurs in several directions and thereby bring about reinforcement in several directions. It is hereby possible to reduce the necessary wall thickness for definite strength properties and thereby to reduce the amount of plastic or the like.

The invention, thus, relates to a method of manufacturing extruded pipes, where plasticized material, for example plastic material, is advanced to an extrusion nozzle comprising a circular gap.

The method is especially characterized in that the material is transported axially in said gap while material is caused to move, such as to rotate, in the circumferential direction of the gap, so that the material at least partially is caused to assume an orientation deviating from the axial direction, whereby non-axial orientation will prevail in the extruded pipe and increase the strength.

The invention also relates to an apparatus for manufacturing extruded pipes, comprising devices for advancing plasticized material, for example plastic material, to an extrusion nozzle comprised in the apparatus, which nozzle comprises a circular gap, through which material is intended to pass in axial direction.

The apparatus is especially characterized in that it comprises devices for moving, for example rotating, material substantially in the circumferential direction of the gap, so that the material at least partially is caused to assume an orientation deviating from the axial direction, whereby non-axial orientation will prevail in the extruded pipe and increase the strength.

Figure 2:
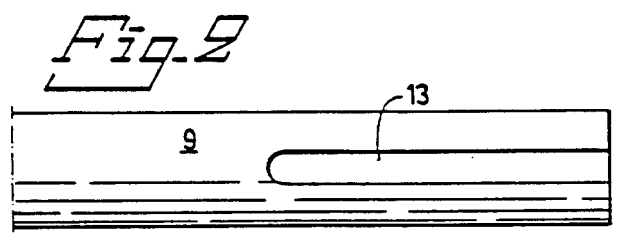
Figure 3:
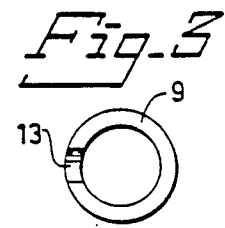
Figure 4:
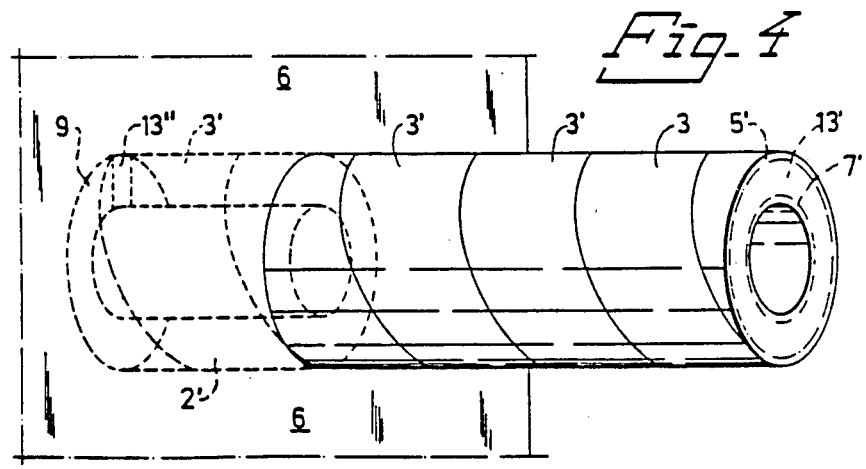

The invention is described in greater detail in the following, with reference to embodiments thereof and to the accompanying drawings, in which FIG. 1 is a schematically shown central section in parallel with the longitudinal direction of the extrusion nozzle at a first embodiment of an apparatus according to the invention, FIG. 2 shows a slitted tubular body intended to be placed rotatably in the circular gap of the extrusion nozzle, FIG. 3 is a view from the right in FIG. 2 of the body according to FIG. 2, FIG. 4 shows schematically an extruded pipe according to the invention adjacent the outer end of the nozzle according to FIG. 1, FIG. 5 shows schematically a portion of a second embodiment of the extrusion nozzle at an apparatus according to the invention, seen from the outer end of the nozzle, FIG. 6 is a vertical central section through a portion of the nozzle according to FIG. 5, FIG. 7 shows schematically a portion of a third embodiment of the nozzle at an apparatus according to the invention, seen as in FIG. 5, FIG. 8 is a vertical central section through a portion of the nozzle according to FIG. 7, and FIG. 9 is a perspective view of a portion of a pipe manufactured by the apparatus according to FIGS. 5 and 6.

In FIG. 1 the numeral 1 designates a feed passageway for the supply of plasticized material, for example so-called HD-polyethene or PVC, to the extrusion nozzle. Also other material, such as rubber, can be extruded. The nozzle comprises a circular gap 2, through which material is intended to pass in axial direction, and where a pipe 3, FIG. 4, formed of the material is intended to run out through the gap 2 at the outer end 4 of the nozzle. At said outer nozzle end 4 a forming space 2' is located, which in the embodiment according to FIG. 1 constitutes a portion of the gap 2. The gap 2 is defined by an outer defining wall 5, which preferably consists of the shell surface 5 of a bore in a block 6 or the like, and an inner defining wall 7, which preferably consists of the shell surface 7 of an axle 8 or the like, which is located concentrically in said bore and enters the bore where the bore joins the feed passageway 1, i.e. at the infeed space 1' for material to the gap 2.

According to a first embodiment of an apparatus according to the invention, a tubular body 9, a pipe 9, is located rotatably and concentrically in the gap 2. Said tubular body 9 is intended to move, rotate the material in the circumferential direction of the gap 2 over the entire cross-section of the gap 2 and, thus, also adjacent the inner defining wall 7 and the outer defining wall 5 of the gap 2. According to this embodiment, the pipe 9 is guided in the gap 2 by means of the axle 8 and bore. At its free end 10 projecting out of the block 6, the pipe 9 is provided with a gearwheel 11 or the like intended to co-operate with an additional gearwheel 12 or the like connected to a drive equipment (not shown). According to the invention, the pipe 9 comprises at least one longitudinal slit 13, FIGS. 1-4, extending from the infeed space 1' to the forming space 2' at the outer end 4 of the nozzle where the end 13" of the slit 13 joining the space 2', thus, constitutes a rotatable outlet 13" for material from slit 13 into space 2'.

In the second embodiment shown in FIGS. 5 and 6 of an apparatus according to the invention, two pipes 14, 15, tubular bodies 14, 15, one inner one 14 and one outer one 15, join said inner defining wall 7 and, respectively, outer defining wall 5 and are rotatable preferably in opposed directions as indicated by the arrows in FIG. 5 and form between themselves a space 16 for substantially axial transport of material. Each pipe 14, 15 comprises at least one longitudinal slit 17, 18, which preferably extend from the infeed space 1' all the way to the forming space 2', where outlets 17", 18", thus, are located. In FIG. 6 an embodiment is shown by fully drawn lines, where the space 16 and slit 17 are intended to be fed with material from the space 1' via the slit 18. It is, of course, imaginable that the slit 14, and thereby also the space 16, also are fed with material via recesses 19 in the outer pipe 15, where the recesses 19 are in contact with the space 1' and slit 17, as shown by dashed line in FIG. 6.

In the third embodiment shown in FIGS. 7 and 8 of an apparatus according to the invention, two pipes 20, 21 are provided, an inner one 20 and an outer one 21, which join said inner defining wall 7 and, respectively, outer defining wall 5, and preferably are rotatable in opposed directions. In this embodiment, however, the pipes 20, 21 join each other so that there is substantially no space 16 between the pipes. Also in this embodiment, each pipe 20, 21 comprises at least one slit 22 and, respectively, 23, which extend in a way corresponding substantially to the slits 17, 18 and comprise outlets 22'', 23''. In this embodiment, the slit 22 in the inner pipe 20 preferably is supplied with material from the space 1, 1' via recesses 24 in the outer pipe 21, as shown schematically in FIG. 8.

At the pipe portion shown in FIG. 9, the layers or portions extending in circumferential direction, which are formed at the manufacture according to FIGS. 5 and 6, are shown schematically. The outer layer 18' is brought about by means of the slit 18 of the pipe 15 and extends helically with clockwise pitch. the intermediate layer 16' is brought about by means of the space 16 between the pipes 14, 15 and extends substantially with axial orientation. The inner layer 17' is brought about by means of the slit 17 of the pipe 14 and extends helically with counter-clockwise pitch. In the manufacture according to FIGS. 7 and 8 there will be no layer 16', because of the absence of a space 16 between the pipes. The thickness of the space 16, of course, can be varied as desired, from thick to very thin or non-existent.

In the embodiments described above, continuously rotating tubular bodies, pipes, were assumed to be comprised. It is, however, possible to use an oscillating rotation movement, which reciprocates in the circumferential direction of the gap 2. In this case the material will be laid out in an obvious manner in subsequent helical sections with alternating pitch direction.

It is also possible to imagine embodiments where the defining walls 5, 7 of the gap 2 are rotatable, preferably in opposed directions, whereby the material is moved in the circumferential direction of the gap 2 at least adjacent said defining walls during the axial material transport. The defining walls can be rotated in the substantial gap 2 and/or the forming space 2' defining the walls. It is also imaginable that only one wall is rotated.

Embodiments can also be imagined which lack the substantial gap 2, and material is transported in at least one closed passageway in a rotatable body all the way to outlets at the forming space 2' located in circumferential direction of the forming space 2'. The gap 2, thus, consists only of the forming space 2'.

The method according to the invention and the mode of operation of the apparatus according to the invention substantially should have become apparent from the aforesaid.

By moving, for example rotating, material in the circumferential direction of the gap 2, 2', orientation is obtained which deviates from the axial direction, whereby non-axial orientation will prevail in the extruded pipe.

In the embodiment shown in FIGS. 1-4, thus, material is fed in from the passageway 1 in the space 1' to the slit 13 in the pipe 9, whereby the material is transported in the longitudinal direction of the slit 13, i.e. axially in the gap 2, at the same time as the material in the slit is rotated in circumferential direction of the gap 2. Hereby, from the slit end located adjacent the outer end 4 of the nozzle a strand 3' of material is laid out substantially in helical configuration, FIG. 4. Each new strand turn fuses with the one laid out last. The molecules in the central portion 13' of the strand, pipe wall, FIG. 4, calculated in radial direction of the pipe 3, will be oriented hereby in a preferred direction, viz. substantially the direction, in which said helix extends. i.e. in the longitudinal direction of the strand 3'. In the inner and outer portions 7' and 5' of the strand, pipe wall, calculated in radial direction of the pipe, i.e. the portions, which were located closest to and in contact with the defining walls 5, 7 of the gap 2, the molecules, due to the rotation and friction against said defining walls, will be oriented in a preferred direction, which differs from the preferred direction in the central portion 13', and which direction depends, among other things, on the advancing speed in the slit 13 and the rotation speed of the pipe 9.

By the differences in orientation thus obtained between the molecules in the central portion 13' of the pipe wall and the inner and outer surface of the pipe wall, a reinforcement of the pipe 3 is obtained at the same time as there is a deviation from axial orientation.

In the embodiment shown in FIGS. 5 and 6, two strands are laid out, FIG. 9, one outer strand 18' and one inner strand 17', in preferably opposedly directed helical configurations, forming an outer portion 18' and an inner portion 17', while the intermediate portion 16' is discharged substantially axially, whereby differences in preferred orientazion of the molecules arise in the intermediate layer 16', on one hand, and in the outer layer 18' and inner layer 17', on the other hand. Further differences in orientation arise adjacent the outer portion of the portion 18' and inner portion of the portion 17', due to the rotation and friction against the defining walls of the gap 2, as described above. In the embodiment according to FIGS. 5 and 6, more extensive differences in orientation are obtained than in the embodiment according to FIGS. 1-4.

The mode of operation at the embodiment according to FIGS. 7 and 8, where the intermediate layer is substantially lacking, should be apparent from the description above.

As should have become clear from the aforesaid, the invention renders it possible to manufacture reinforced pipes in a very simple and inexpensive way, where reinforcement is obtained by differences in preferred orientation direction between portions 5', 7', 13', 16', 17', 18' in radial direction of the pipe 3 at the same time as deviation occurs from axial orientation. For a definite pipe geometry, a pipe manufactured according to the invention resists a several times higher overpressure than a pipe extruded in known manner and with substantially one preferred orientation direction extending in axial direction. In a corresponding manner, for a definite capacity of resistance against inner overpressure, the wall thickness of a pipe according to the invention can be reduced substantially, thereby rendering possible great savings in material.

The invention has been described above with reference to some embodiments. It is, of course, possible to imagine more embodiments and minor alterations without abandoning the invention idea.

The size and distribution of the orientation deviations, for example, can be controlled by adjusting and controlling the advancing speed of the material in each slit in relation to the rotation speed of the respective pipe. A certain control of the orientation deviation can be obtained also by adjusting the length of the pipe-free portion 2', 25 of the gap 2 in connectioin to the outer end 4 of the nozzle, in which portion 25 re-orientation to axial direction occurs due to said friction. When the portion 2', 25 is sufficiently short, substantially no reorientation will occur.

Further, embodiments can be thought, where the two pipes 14, 15, 20, 21 rotate in the same direction.

The invention, thus, must not be regarded restricted to the embodiments set forth above, but can be varied within its scope defined in the attached claims.

We claim:

1. A method of manufacturing extruded pipes where plasticized material is advanced to an extrusion nozzle comprising a circular gap, the material being transported axially in said gap while material is caused to be rotationally moved in the circumferential direction of the gap so that the material at least partially is caused to assume an orientation deviating from the axial direction, whereby non-axial orientation will prevail in the extruded pipe and increase the strength, the material being supplied to a forming space at the outer end of the extrusion nozzle by means of at least one outlet for material which material moves continuously, by rotating or oscillating in circumferential direction of the gap characterized in that the material is caused to move in the circumferential direction of the gap (2) at least adjacent the inner (7) and outer (5) defining walls of the gap (2) by means of at least one rotary tubular body (9, 14, 15, 20, 21) comprising at least one longitudinal slit (13, 17, 18, 22, 23) extending between a feed-in space (1'), for the material, and said forming space (2') located at the outer end (4) of the extruding nozzle, in which slit said material is fed in and from which slit material is discharged to the forming space (2').

2. An apparatus for manufacturing extruded pipes, comprising devices for advancing plasticized material to an extrusion nozzle included in the apparatus, which nozzle comprises a circular gap, through which material is intended to pass in an axial direction, devices (5, 7, 9, 14, 15, 20, 21) being provided for rotationally moving material substantially in the circumferential direction of the gap, so that the material at least partially is caused to assume an orientation deviating from the axial direction, whereby non-axial orientation will prevail in the extruded pipe and increase the strength, at least one outlet means for material being provided, which outlet means is located and is adapted for continuously or oscillating rotatable movement in the circumferential direction of the gap, and from which outlet means the material is intended to be supplied to a forming space located at the outer end of the extrusion nozzle, characterized in that at least one tubular body (9, 14, 15, 20, 21) is rotatably disposed in said gap (2), which tubular body is intended for moving material in the circumferential direction of the gap, said material being intended to be moved in said circumferential direction at least adjacent the inner and outer walls of the gap (2), said tubular bodies (9, 14, 15, 20, 21) comprising at least one longitudinal slit (13, 17, 18, 22, 23) extending between a feed-in space (1') for the material and said forming space (2') located at the outer end (4) of the extrusion nozzle.

3. A method as defined in claim 1, characterized in that the material is transported substantially axially in a space (16) formed between two pipes, an inner one (14) and an outer one (15), and that the pipes (14, 15) joining said inner (7) and, respectively, said outer (5) defining wall are caused to rotate in preferably opposed directions, whereby material is fed-in in at least one longitudinal slit (17, 18) in each pipe (14, 15), from which material is discharged to the forming space (2').

4. A method as defined in claim 3, characterized in that said space formed between the pipes (20, 21) is very small or non-existing, and the plastic material is transported axially substantially only in said slits (22, 23).

5. A method as defined in claim 3, characterized in that material is supplied to the slit(s) (17, 22) of said inner pipe (14, 20) at recesses (19, 24) in the outer pipe (15, 21).

6. A method as defined in claim 1, characterized in that distribution and size of said orientation deviations from the axial direction partially are controlled by adjusting and controlling the advancing speed of the material in said slit(s) (13, 17, 18, 22, 23) in relation to the rotation speed of the pipe(s) (9, 14, 15, 20, 21).

7. A method as defined in claim 1, characterized in that the length of the portion (25) of said gap (2) adjacent the outer end (4) of the extrusion nozzle, i.e. the length of the forming space (2'), is adjusted so that greatest possible orientation deviations are obtained.

8. A method as defined in claim 1, characterized in that deviations in orientation from said axial direction at least adjacent the inner (7) and outer (5) defining walls of the gap (2) are effected by rotation of said defining walls preferably in opposed directions.

9. An apparatus as defined in claim 2, characterized in that two pipes (14, 15) are provided, one inner one (14) and one outer one (15), which join said inner (7) and, respectively, said outer (5) defining wall and are rotatable preferably in opposed directions and between themselves form a space (16) for substantially axial transport of material, and that each pipe (14, 15) comprises at least one longitudinal slit (17, 18) extending between a feed-in space (1') for the material and said forming space (2').

10. An apparatus as defined in claim 9, characterized in that said space (16) between the pipes (20, 21) is very small or substantially non-existing.

11. An apparatus as defined in claim 9 characterized in that said outer pipe comprises recesses (19, 24) in contact with said feed-in space (1') and the slit(s) (17, 22) of said inner pipe (14, 20), via which recesses (19, 24) material is intended to be supplied to the slit(s) of the inner pipe.

12. An apparatus as defined in claim 2, characterized in that devices are provided for adjusting and controlling the rotation speed of said pipe (9, 14, 15, 20, 21), whereby said rotation speed can be controlled in relation to the advancing speed of the material in said slit(s) (13, 17, 18, 22, 23) and whereby the distribution and size of said orientation deviations partially can be controlled.

13. An apparatus as defined in claim 2, characterized in that said inner (7) and outer (5) defining walls are rotatable in the circumferential direction of the gap (2), preferably in opposed directions.

* * * * *